(12) United States Patent
Lin et al.

(10) Patent No.: US 8,335,885 B2
(45) Date of Patent: Dec. 18, 2012

(54) STORAGE DEVICE AND METHOD OF ACCESSING A STATUS THEREOF

(75) Inventors: Hung-Wei Lin, Chung-He (TW); Hsiao-Te Chang, Taoyuan (TW)

(73) Assignee: Silicon Motion, Inc., Jhubei (TW)

( * ) Notice: Subject to any disclaimer, the term of this patent is extended or adjusted under 35 U.S.C. 154(b) by 587 days.

(21) Appl. No.: 12/103,135

(22) Filed: Apr. 15, 2008

(65) Prior Publication Data

US 2009/0106519 A1    Apr. 23, 2009

(30) Foreign Application Priority Data

Oct. 17, 2007 (TW) .............................. 96138888 A

(51) Int. Cl.
*G06F 12/00* (2006.01)
(52) U.S. Cl. ........................................ 711/103; 711/102
(58) Field of Classification Search .................... 711/103
See application file for complete search history.

(56) References Cited

U.S. PATENT DOCUMENTS

| 7,287,118 | B2 * | 10/2007 | Chang et al. | 711/103 |
| 7,434,122 | B2 * | 10/2008 | Jo | 714/723 |
| 7,516,267 | B2 * | 4/2009 | Coulson et al. | 711/103 |
| 2007/0011395 | A1 * | 1/2007 | Kim | 711/103 |
| 2007/0180328 | A1 * | 8/2007 | Cornwell et al. | 714/42 |
| 2008/0307270 | A1 * | 12/2008 | Li | 714/47 |

FOREIGN PATENT DOCUMENTS

| CN | 1716450 | 1/2006 |
| KR | 2001-5824 | 1/2001 |
| WO | 98/44420 | 10/1998 |

OTHER PUBLICATIONS

Office Action from corresponding Korean Application No. 10-2007-0120684 dated Mar. 18, 2010.
ATA8-ACS, Revision 3f, Dec. 11, 2006.
Office Action from corresponding Chinese Application No. 2007101817645 dated Jul. 15, 2010. English machine translation attached.

* cited by examiner

*Primary Examiner* — Tuan Thai
*Assistant Examiner* — Ngoc Dinh
(74) *Attorney, Agent, or Firm* — Ditthavong Mori & Steiner, P.C.

(57) ABSTRACT

A storage device and a method of accessing a status thereof are provided. The storage device is disposed in a host. The device data structure field of the storage device is adapted to record the status of the non-volatile memory. The control module is adapted to access the status according to a control signal from the host. Therefore, the operating system or the application of the host is capable of getting the status of the non-volatile memory to ensure the safety of the stored data.

11 Claims, 3 Drawing Sheets

STORAGE DEVICE AND METHOD OF ACCESSING A STATUS THEREOF

This application claims priority to Taiwan Patent Application No. 096138888 filed on Oct. 17, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a storage device and a method of accessing a status thereof. In particular, the present invention relates to a storage device comprising a non-volatile memory which uses a device data structure field to record status information.

2. Descriptions of the Related Art

Non-volatile memories are classified into read only memories (ROMs) and flash memories depending on whether they allow data stored therein to be randomly rewritten. Flash memories, which are widely used in various electronic apparatuses such as mobile phones, digital cameras, MP3 players and the like, have many advantages. Nonetheless, flash memories are also known to have an unfavorable electrical characteristic. That is, the hardware thereof can be erased only a certain number of times. Typically, a flash memory with single level cells (SLC) can be erased one hundred thousand times, while those with multiple level cells (MLC) can be erased only ten thousand times. Moreover, bad blocks, which cannot be written to, often result from normal use, and once all the spare blocks become bad, it becomes difficult to write data into the flash memory.

Currently, there are disc drives that adopt flash memories as the storage unit. After using these drives for a long period of time, there will be an increased susceptibility to damage because of the increased read/write times. Accordingly, there is a need to report the status of the disc drive to an operating system and associated applications when an abnormal status arises or the disc drive is coming to the end of its service life. The user can then replace the disk drive or make a backup copy of the data before the disc drive fails, thereby ensuring safety of the data.

Technologies for reporting the status information of a disc drive using a flash memory as the storage unit have not been proposed yet in the prior art. The practice currently adopted to manage flash memories is to store status information thereof into a controller chip within the flash memory, which is inaccessible to common operating systems and associated monitoring applications. Consequently, such status information of the flash memory can only be accessed by means of the applications supplied by the manufacturer thereof. However, because controller chips from different manufactures vary from each other, an application from one manufacture is incompatible with memory controller chips from other manufacturers.

As a result, it is important to provide a mechanism for reporting the status information of such a disc drive to an operating system and monitoring applications thereof to ensure the safety of data stored therein.

SUMMARY OF THE INVENTION

One objective of this invention is to provide a storage device. The storage device, which is disposed in a host, comprises a non-volatile memory and a device data structure field for storing status information. The device data structure field complies with a general protocol so that an operating system or an application within the host is capable of accessing the status information of the non volatile memory by sending a control signal to the storage device to determine a status of the storage device comprising the non-volatile memory.

Another objective of this invention is to provide a storage device comprising a pre-definable device data structure field. The device data structure field is adapted to store desired status information and report it to an operating system or an application so that the operating system or the application can determine a status of the storage device.

To this end, the storage device comprises a non-volatile memory, a device data structure field adapted to record status information of the non-volatile memory, and a control module adapted to access the status information in the device data structure field in response to a control signal from the host. In this way, the operating system is capable of accessing the status information of the non-volatile memory using the control signal from the host to monitor a status of the storage device.

Yet a further objective of this invention is to provide a method of accessing status information of a storage device. The storage device comprises a non-volatile memory, which in turn comprises a device data structure field adapted to store the status information. With this method, the status information can be accessed only by using the data device structure field of the non-volatile memory.

To this end, the method of accessing status information of a storage device comprises steps of: receiving a control signal from a host; accessing the status information of the device data structure field according to the control signal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Embodiments will be described herein below to explain this invention. This invention relates to a storage device comprising a non-volatile memory. However, these embodiments are not intended to limit this invention to any specific context, applications or with particular methods described in these embodiments. Therefore, descriptions of these embodiments are only intended to illustrate rather than to limit this invention. It should be noted that in the following embodiments and attached drawings, elements not directly related to this invention are omitted from depiction.

Figure 1:
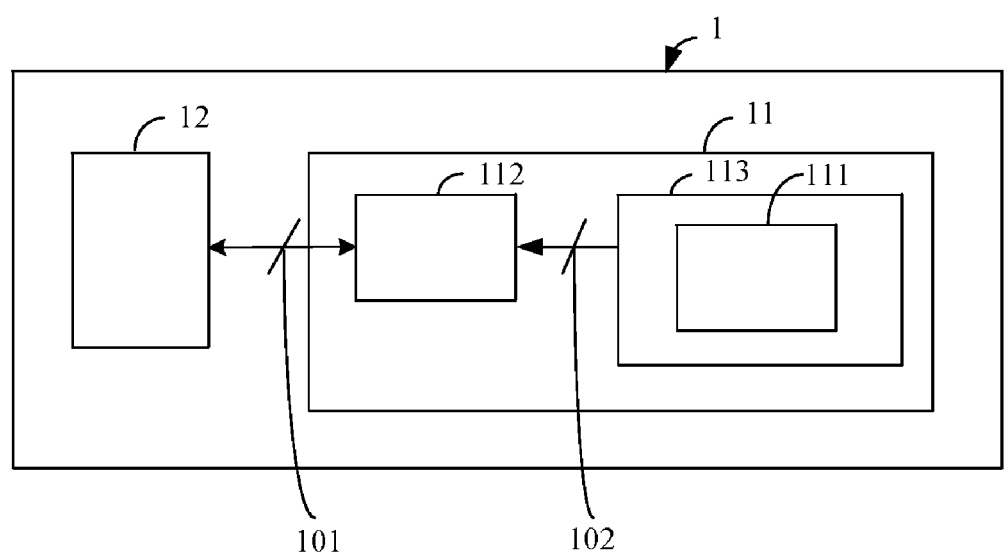
FIG. 1 illustrates the first embodiment of this invention.

FIG. 1 illustrates the connections between a storage device 11 and a bus interface 12 within a host 1 in accordance with a first embodiment of this invention. The bus interface 12 complies with ATA/ATAPI specifications. The storage device 11, which is disposed inside the host 1, comprises a device data structure field 111, a control module 112 and a non-volatile memory 113. The non-volatile memory 113, which in this embodiment is a flash memory, is adapted to receive a control signal 101 from the host 1 via the bus interface 12 to perform an access operation. The device data structure field 111 is adapted to store status information 102 of the non-volatile memory 113. The control module 112 is adapted to access the status information 102 in the device data structure field 111 in response to a control signal from the host 1.

The status information 102 comprises information about the current status and stability of the non-volatile memory 113. The host 1 uses a control signal 101 compatible with a general protocol to read the status information 102 via the bus interface 12. In this embodiment, the general protocol is the self-monitoring, analysis, and reporting technology (S.M.A.R.T.) protocol. In a storage device 11 complying with the S.M.A.R.T. protocol, the device data structure field 111 has a plurality of bit addresses arranged in sequence, among which bit addresses from 386 to 510 are reserved as a user-definable field. The status information 102 is stored in a bit address range from 0 to 361, and accordingly, an operating system or a monitoring application of the host 1 is capable of accessing the status information of the storage device 11 by reading the bit addresses from 0 to 361.

As described above, the non-volatile memory 113 includes a flash memory, i.e., a plurality of blocks, such as data blocks, blank blocks, temporary blocks, and bad blocks. Therefore, the status information 102 comprises at least a number of the blocks in use, a number of the bad blocks, and a number of the blank blocks. The status information 102 may also comprise a number of originally bad blocks, a number of worn blocks, capacity of a page, a number of replaced pages, a number of initially mapped out pages, or the like.

Figure 2:
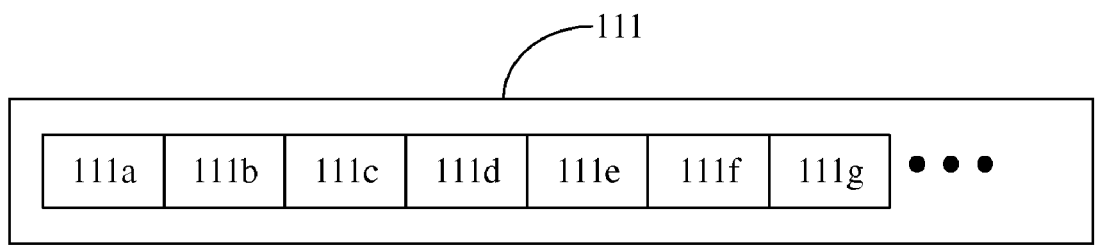
FIG. 2 illustrates the device data structure field in the first embodiment of this invention.

For ease of understanding, content defined in the device data structure field 111 in this embodiment will be further described herein below. Referring to FIG. 2, the device data structure field 111 comprises fields 111a, 111b, 111c, 111d, 111e and 111f. More specifically, the field 111a comprising bit addresses 386 to 395 represents information related to the non-volatile memory 113; the field 111b comprising bit address 396 represents a number of management units included in the non-volatile memory 113; the field 111c comprising bit address 397 represents a management unit A, which is one of the plurality of management units included in the non-volatile memory 113; the field 111d comprising bit address 398 represents a number of data blocks in the management unit A; the field 111e comprising bit address 400 represents a number of blank blocks in the management unit A; the field 111f comprising bit address 401 represents a number of originally bad blocks in the management unit A; and the field 111g comprising bit address 402 represents a number of worn blocks in the management unit A. It should be noted that information about other management units included in the non-volatile memory 113 may be stored in other fields of the device data structure field 111 and will not be further described for sake of simplicity. Further, the device data structure field 111 may also incorporate information related to other non-volatile memories. The above description is provided only for purpose of illustration, rather than to limit scope of this invention.

The operating system or monitoring application of the host 1 may use a control signal 101 to access the status information 102 in the device data structure field 111 via the control module 112 at any time when the host 1 is activated. As a result, it is possible for the operating system or the monitoring application to determine the current status of the storage device 11 (for example, if it is coming to an end of its service life) according to this status information 102 each time the host 1 is activated to inform it to the user in time.

In other embodiments, the operating system or the monitoring application may also use a control signal 101 complying with S.M.A.R.T. protocols to access the status information 102 in the device data structure field 111 via the control module 112 on a periodical basis or randomly to present the status of the storage device 11.

A second embodiment of this invention provides a method of accessing status information of a storage device. The storage device comprises a non-volatile memory, which in turn comprises a device data structure field adapted to store the status information. This method is adapted to be applied in the storage device 11 depicted in FIG. 1, in which the non-volatile memory 113 is a flash memory comprising a plurality of blocks.

Figure 3:
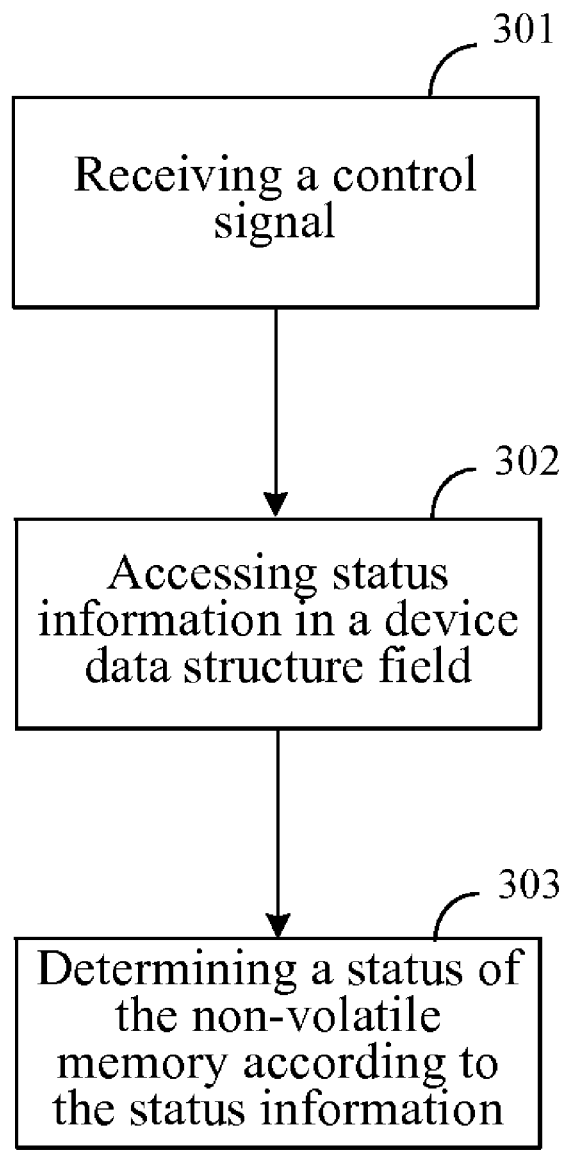
FIG. 3 is a flow diagram illustrating a method of accessing a storage device in accordance with this invention.

FIG. 3 illustrates a flow diagram when using this method to access the storage device 11. Initially in step 301, the non-volatile memory 113 receives a control signal 101 via the bus interface 12 from the host 1. The control signal 101 is compatible with the S.M.A.R.T. protocols. Then in step 302, in response to the control signal 101, the status information 102 in the device data structure field 111 is accessed. Finally in step 302, a status of the non-volatile memory 113 is determined according to the status information 102. The status information 102 includes at least one of a number of the data blocks, a number of bad blocks and a number of blank blocks, which are just as described above in the first embodiment and will not be described in detail again.

It follows from the above description that this invention stores status information of a non-volatile memory included in a storage device by defining the device data structure field. In this way, an operating system or a monitoring application is capable of accessing the status information directly and providing determinative information about the storage device to a user. Accordingly, with this invention, the shortcomings of the storage devices of the prior art is prevented.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A storage device disposed in a host, the storage device comprising:
    a non-volatile memory, comprising a device data structure field, for recording status information of the non-volatile memory; and
    a control module, adapted to access the status information of the device data structure field according to a control signal from the host,
    wherein the non-volatile memory comprises a plurality of blocks, each of the blocks comprises a plurality of pages, and the status information comprises at least one of capacity of a page, a number of replaced pages, and a number of initially mapped out pages.

2. The storage device of claim 1, wherein the non-volatile memory is a flash memory.

3. The storage device of claim 1, wherein the control signal is compatible with the self-monitoring, analysis, and reporting technology, (S.M.A.R.T) protocols.

4. The storage device of claim 1, wherein the status information further comprises at least one of a number of data blocks, a number of bad blocks and a number of blank blocks.

5. The storage device of claim 1, wherein the status information further comprises at least one of a number of originally bad blocks, and a number of worn blocks.

6. The storage device of claim 1, wherein the control module is configured to access the status information of the device data structure field when the host is activated.

7. The storage device of claim 1, wherein the control module is configured to access the status information of the device data structure field regularly or randomly.

8. The storage device of claim 1, wherein the non-volatile memory has a plurality of bit addresses arranged in sequence, and the device data structure field is located in a range from bit address 386 to bit address 510.

9. The storage device of claim 8, wherein the bit addresses in the range from bit address 386 to bit address 510 are reserved as a user-definable field.

10. A method of accessing status information of a storage device within a host, the storage device comprising a non-volatile memory, the non-volatile memory comprising a device data structure field, the status information being stored in the device data structure field, the method comprising the following steps:
    receiving a control signal from within the host;
    accessing the status information of the device data structure field according to the control signal; and
    determining a status of the non-volatile memory according to the status information,
    wherein the non-volatile memory comprises a plurality of blocks, each of the blocks comprises a plurality of pages, and the status information comprises at least one of capacity of a page, a number of replaced pages, and a number of initially mapped out pages.

11. The method of claim 10, wherein the control signal is compatible with the S.M.A.R.T. protocols.

* * * * *